(12) United States Patent
Ängquist et al.

(10) Patent No.: US 8,310,095 B2
(45) Date of Patent: Nov. 13, 2012

(54) POWER COMPENSATOR AND METHOD FOR PROVIDING A BLACK START WITH THAT COMPENSATOR

(75) Inventors: Lennart Ängquist, Enköping (SE); Magnus Callavik, Stocksund (SE); Willy Hermansson, Västerås (SE); Stefan Johansson, Västerås (SE); Gunnar Russberg, Västerås (SE); Jan R. Svensson, Västerås (SE)

(73) Assignee: ABB Research Ltd., Zürich (CH)

( * ) Notice: Subject to any disclaimer, the term of this patent is extended or adjusted under 35 U.S.C. 154(b) by 777 days.

(21) Appl. No.: 12/306,936

(22) PCT Filed: Jun. 30, 2006

(86) PCT No.: PCT/SE2006/000823
§ 371 (c)(1),
(2), (4) Date: Jun. 30, 2009

(87) PCT Pub. No.: WO2008/002223
PCT Pub. Date: Jan. 3, 2008

(65) Prior Publication Data
US 2009/0309421 A1 Dec. 17, 2009

(51) Int. Cl.
*H02J 1/00* (2006.01)
*H02J 3/00* (2006.01)
*H02J 7/34* (2006.01)

(52) U.S. Cl. .......... 307/48; 307/44; 307/45; 307/46; 307/102

(58) Field of Classification Search ........... 307/44, 307/45, 46, 48, 102
See application file for complete search history.

(56) References Cited

U.S. PATENT DOCUMENTS

| 4,502,000 A | 2/1985 | Mashikian |
| 6,534,954 B1 | 3/2003 | Plett |
| 6,747,370 B2 | 6/2004 | Abe |
| 2005/0012395 A1* | 1/2005 | Eckroad et al. .......... 307/44 |

OTHER PUBLICATIONS

Papic et al., 300 kW Battery Energy Storage System Using an IGBT Converter, Power Engineering Society summer Meeting, 1999, IEEE Edmonton, Alberta, Canada, Jul. 18-22, 1999.
Zhan et al., Dynamic Voltage Restorer Bases on Voltage-Space-Vector PWM Control, IEEE Transactions on Industry Applications, vol. 37, No. 6, Nov./Dec. 2001.
PCT/ISA/210—International Search Report—Feb. 12, 2007.
PCT/IPEA/409—International Preliminary Report on Patentability—May 26, 2008.

\* cited by examiner

*Primary Examiner* — Hal Kaplan
(74) *Attorney, Agent, or Firm* — Venable LLP; Eric J. Franklin

(57) ABSTRACT

A power compensator for an electric power transmission line. The power compensator includes a voltage source converter, a capacitor and an energy storage device. The energy storage device includes a high voltage battery having a short circuit failure mode, a first main switch and second main switch for disconnecting the battery from the capacitor, and a control unit for operating the first and second switch.

12 Claims, 3 Drawing Sheets

US 8,310,095 B2

POWER COMPENSATOR AND METHOD FOR PROVIDING A BLACK START WITH THAT COMPENSATOR

CROSS-REFERENCE TO RELATED APPLICATIONS

This application is the national phase under 35 U.S.C. §371 of PCT/SE2006/000823 filed 30 Jun. 2006.

TECHNICAL FIELD

The present invention concerns power compensation of a high voltage transmission line. By a transmission line should be understood a conductor for electric power transmission or distribution line within the range of 6 kV and upwards. Especially the invention concerns an apparatus for providing a rapid exchange of electric power on a high voltage transmission line. The apparatus comprises a voltage source converter (VSC) and an energy storage device. In particular the invention is related to a black start of a dead network.

BACKGROUND OF THE INVENTION

Within flexible alternating current transmission system (FACTS) a plurality of control apparatus are known. One such FACTS apparatus is a static compensator (STATCOM). A STATCOM comprises a voltage source converter (VSC) having an ac side connected to the transmission line and a dc side connected to a temporary electric power storage means such as capacitor means. In a STATCOM the voltage magnitude output is controlled thus resulting in the compensator supplying reactive power or absorbing reactive power from the transmission line. The voltage source converter comprises at least six self-commutated semiconductor switches, each of which shunted by a reverse parallel connected diode. Since a STATCOM apparatus has no active power source it can only compensate for reactive power.

From U.S. Pat. No. 6,747,370 (Abe) a power compensation system using a converter connected to a high temperature secondary battery is previously known. The object of the compensation system is to provide an economical, high-temperature secondary battery based energy storage, which have a peak shaving function, a load leveling function and a quality stabilizing function. The known system comprises an electric power supply system, an electric load and an electric energy storage system including a high temperature secondary battery and a power conversion system. The battery is a sodium sulfur battery.

The system is arranged at an end of an electric power line. The load is a factory which under normal operating condition is provided with electric power supply from the power line. In case of power supply failure a high speed switch disconnects the power line and electric power is instead provided from the secondary battery. At the same time a back up generator is started. The known system having a sodium sulfur battery indicates that the power compensating system provides low power during a long time.

In one mode of operation the battery is providing extra energy to the factory during daytime while being recharged during night. In order to supply a factory with uninterruptible power there are arranged ten parallel connected battery units of 1280 V, each having a converter of 500 kW. In a further embodiment ten battery units are parallel connected in series with a 5 MW converter. In this embodiment a group of spare batteries is arranged for use with the high temperature battery circuit. In the event of a battery unit having a failure the failed unit is disconnected and the spare group is connected in parallel with the circuit.

Restoring power after a wide-area power outage can be difficult. A plurality of power stations needs to be brought back on-line. Normally, this is done with the help of power from the rest of the grid. In the absence of grid power, a so-called black start needs to be performed to bootstrap the power grid into operation.

To provide a black start, some power stations are typically equipped with small diesel generators which can be used to start larger generators (of several megawatts capacity), which in turn can be used to start the main power station generators. Generating plants using steam turbines require station service power of up to 10% of their capacity for boiler feedwater pumps, boiler forced-draft combustion air blowers, and for fuel preparation. It is, however, uneconomic to provide such a large standby capacity at each station, so black-start power must be provided over the electrical transmission network from other stations.

A typical sequence (based on a real scenario) might be as follows:

A battery starts a small diesel generator installed in a hydroelectric generating station.
The power from the diesel generator is used to bring the hydroelectric generating station into operation.
Key transmission lines between the hydro station and other areas are energized.
The power from the hydro dam is used to start one of the coal-fired base load plants.
The power from the base load plant is used to restart all of the other power plants in the system including the nuclear power plants.
Power is finally re-applied to the general electricity distribution network and sent to the consumers.

To restore the power after an outage is not an easy process. Small disturbances are continually occurring while the system is weak and fragile during the restoration process, and the grid will experience different conditions from a dead network over a variety of weak network conditions to a normal strong AC network. In order to maintain the frequency and voltage stability during the restoring process, an overall coordinated system restoration plan is necessary. Hence a black start contains a first stage where the network is energized. In this stage the frequency and a phase angle must be established. In a second stage which is the recovery stage the network is unstable and very vulnerable. In this stage a certain slack must be provided by which is meant that energy must be provided to the network during part of the time while during another part of time energy must be transferred away from the network.

SUMMARY OF THE INVENTION

An exemplary object of the present invention is to seek ways to improve a black start of a power network.

This object is achieved according to the invention by a power compensator or by a method.

According to the invention a power compensator comprising a voltage source converter (VSC), capacitor means and a powerful electric energy source connected in parallel thereto is providing both energizing capacity to the network and recovery capacity of the network by being capable of both delivering electric energy and consuming, by loading the battery, electric energy from the network. To influence the black start process there must be provided to the dead network an input power of sufficient strength and with sufficient duration. Such power source is according to the invention provided by a powerful battery means comprising a short circuit failure mode. By short circuit failure mode should be understood that in case of an interior failure of the energy storage device the electric circuit will be kept closed. The short circuit failure mode may be effected by the inner performance of the battery cell. It may also be effected by a controllable switch making a parallel loop with the battery cell.

To start up a voltage source converter connected to a dead network is not an easy task. Normally the VSC is connected to the network by a transformer. In the transformer there are separate winding to provide auxiliary power to the VSC and its equipment. There are also embodiments where auxiliary power is provided by a separate transformer connected to the power line. In a dead network no auxiliary power can be provided from these solutions. Hence a first power source must be arranged internally to provide auxiliary power for the control means.

In a fault situation the exchange of power with the network is stopped. A switch on both electrodes connecting the battery to the capacitor is opened. This means that in a total outrage of the network there is still power contained in the battery means of the apparatus. In performing a black start the capacitor means is slowly energized from the battery means by connecting a resistor means in series with both electrodes of the battery means. As soon as the capacitor means is energized switching of the converter may begin. This results in an ac power to the network. This will also provide auxiliary power to the converter from a transformer on the ac side.

By providing power to the network in this way other generation units on the network will be provided with auxiliary power to come into power production. Hence in a few moments of time a plurality of generations units may be in production. In the restoration phase more and more power producers and consumers will be connected. However, the connections of these producers and consumers may occur in an uncontrolled way. This means that in one moment of time there will be an overproduction while in a second moment there will be an overconsumption of power. The network therefore needs to be balanced. According to the invention this is achieved by the power compensator. Hence when the network experience an overproduction of power the battery means of the power compensator is charged and when the network experience an overconsumption the battery means is providing the power needed to keep the network in balance.

The power supplied VSC may act very rapidly since it has no inertia. On the other hand the VSC must comprise safety arrangement not to be overloaded. The series connected extinguishable semiconductors of the converter valve cannot handle too high a current.

Since the energy storage device must be capable of exchanging energy at all times there must be arranged for redundancy in case of a battery failure. Batteries having an open circuit failure mode must therefore be connected in parallel. Batteries having a short circuit failure mode may be connected in series thus reaching much higher voltage levels. In an embodiment of the invention the energy storage device comprises a high voltage battery containing a plurality of battery cells, each having a short circuit failure mode. A plurality of such batteries connected in series will always provide a closed circuit and thus be capable of providing electric energy even with a battery cell failure. A plurality of batteries connected in series will also be capable of providing energy at high voltage in the range of 6 kV and above.

According to an embodiment of the invention the battery comprises a high temperature battery containing a plurality of sodium/metal chloride battery cells having an operating temperature in the range of 270-340° C. A battery unit comprises a heat insulated box containing a plurality of series connected battery cells. The battery unit has two terminals comprising an electric circuit in the range of 1500 V. Connecting four such battery units in series will thus reach a voltage level of 6 kV. The battery unit comprises a local pipe loop for housing a heat transfer medium in the form of a fluid. The fluid may be a liquid medium as well as a gaseous medium.

A criteria for the function of the battery, e.g. to be able to store and release electric energy, is that the temperature inside the battery cell is kept between 270 and 340° C. At operation mode such as when the battery is being charged or discharged heat is generated within the battery. At idling mode, however, no heat is generated inside the battery. Thus at the idling mode heat has to be provided from outside the battery.

In an embodiment of the invention the power compensator comprises a temperature monitor for maintaining the operation temperature of the battery unit. Thus the temperature monitor is providing heat during the idling mode. The temperature monitor contains a pipe network for providing a flow of the heat transfer medium through the battery units. The pipe network comprises a main pipe loop and at least one fluid moving unit, such as a fan or a pump. The pipe network includes the local pipe loop of each battery unit and provides a passageway for the heat transfer medium. The heat comprised in the heat transfer medium is transferred to the battery cells by convection.

According to an embodiment of the invention the local pipe loop comprises a first end for receiving a stream of a gaseous medium, and a second end for exhausting the gaseous medium. In an embodiment the gaseous medium comprises preferably air. Further the main pipe loop comprises an upstream side for providing hot air and a downstream side for receiving disposed air. Each first end of each local pipe loop is connected to the upstream side of the main pipe loop. Each second end of the each local pipe loop is connected to the downstream side of the main pipe loop. All connections between the main pipe loop and each local pipe loop comprises a connection pipe. The main loop comprises at least one fan and a heat providing means. In an embodiment of the invention the main pipe loop is grounded and thus exhibits the ground potential. Each local pipe loop exhibit the same potential as the battery unit housing the local pipe loop. In a further embodiment each connection pipe comprises a tube of a heat resisting and electric insulating material, such as a ceramic material.

In yet a further embodiment of the invention the temperature monitor is also during the operation mode of the battery unit providing a cooled air for disposal of heat generated from the battery cells.

According to an embodiment of the invention the power compensator system comprises a system for controlling the performance and the action of the power compensator. The control system contains a charge monitor for maintaining the charge and discharge respectively of the energy storage device. Since the charging and discharging behavior of a sodium/metal chloride battery is complicated the state of charge (SOC) of the battery cannot be measured but must be estimated. Also the current of the battery cannot be measured with a sufficient accuracy. The charge monitor therefore comprises a SOC-module for estimating and predicting the state of charge of the battery.

A sodium/metal chloride battery cell comprises an electrolyte contained in a thin barrier of a ceramic material. Outside the barrier the battery cell comprises sodium being a first electrode. The second electrode comprises a pair of nickel plated copper electrodes to which is connected a metallic structure spreading into the electrolyte. When the battery is charged or discharged a reaction front is propagating inwardly from the ceramic barrier. Thus both the charging and discharging is propagating in the same direction and starting from the ceramic barrier. Resulting from a plurality of charging and discharging cycles there may be left inside the battery cell a plurality of areas defining power capacity areas and non-power capacity areas. Hence the SOC-module must be capable to sum only the areas which represent power capacity.

The SOC-module comprises a virtual model of the battery. The virtual model contains a plurality of model parts representing specific relations of parameters and input values. Thus the virtual model comprises a measurement part model containing the relation between voltage, current, temperature and other parameters. Further the virtual model contains a part model for estimating the actual SOC value containing memory means for historic data. The virtual model also contains a part model for predicting a future SOC-value containing a calculating model. Another part model is relating to historic data such as charging events, discharging events, recovery data and such.

The main objective of the virtual model is to produce a SOC-value which represents the remaining capacity of the battery. The SOC-value may be presented as a percentage value of full capacity of the battery. Another aim for maintenance of the battery comprises charge and discharge of the battery such that overcharges or undercharged never occurs and such that the battery temperature is always kept within the allowable range.

By using the virtual model of the battery the SOC-module predicts also the SOC-value at a later point in time dependent on the power profile and duration. While using the capacity of the battery in a power compensation situation the predicted SOC-value will tell if there is sufficient capacity for a predetermined mission. If for instance there is a power shortage in the transmission line the predicted SOC-value will tell if the capacity of the battery is sufficient for providing energy during a given period of time. This may happen after a power line failure and before power is provided again by other sources, such as start up period of a generator. If there is an excess of generated power on the transmission line, for instance due to a fault, the predicted SOC-value will instantly tell if the battery is capable to receive power from the transmission line. Hence the power compensator according to the invention is capable of both providing energy and receiving energy from the transmission line in a short time perspective, such as milliseconds, as well as in a longer time perspective, such as minutes.

In an embodiment of the invention the control system comprises a plurality of sensors for sensing voltage, current, temperature and other parameters. For electric power supply to these sensors the system comprises a power supply unit on each battery unit. The power supply unit is galvanic isolated from earth and comprises the same potential as the battery unit. The power supply may comprise a fuel cell, a solar cell, a thermo-electric element such as a peltier element and others. In an embodiment the power supply unit comprises battery means. For sending the information to the control system each sensor may communicate by help of a wireless system or an optical fiber. Each battery may also comprise a central communication device for communication of information.

According to an embodiment of the invention there is arranged on each galvanically isolated battery unit a communication module. The module comprises radio communication means, power supply and a plurality of sensing transducers. Also the communication module is galvanically isolated and thus achieving the same potential as the battery unit. The module may communicate within a wireless local area network, such as a WLAN or a Bluetooth network. The sensed values, such as voltage, current and temperature are preferably transmitted in digital form. To save power consumption the communication is arranged in short part of a time period. Thus the communication means need only be electrified during a small percentage of time. The communication may preferable take place within the 2 GHz band. The power supply comprises in one embodiment a back up battery and electric energy providing means. Such energy means may comprise any kind of generator configuration as well as a solar cell, peltier element, a fuel cell or other means.

A principal circuit of a power compensator 1 connected via a transformer 2 to an electric power transmission line 3 is shown in FIG. 1. The power compensator comprises a voltage source converter 4, a capacitor means 6 and an energy storage device 5. The voltage source converter comprises at least six selfcommutated semiconductor switches, each of which is shunted by a reverse parallel connected diode. The voltage source converter has an ac side connected to the transformer and a dc side connected to the capacitor means and the energy storage device.

In a first aspect of the invention the object is achieved by a power compensator for an electric power transmission line, the compensator comprising a voltage source converter and an energy storage device, wherein the energy storage device comprises a high voltage battery means having a short circuit failure mode. In a further embodiment the energy storage device comprises a high energy, high temperature sodium/metal chloride battery. In yet a further embodiment the power compensator further comprises a temperature monitor for keeping the temperature within the operation range of the battery means. In still a further embodiment the power compensator further comprises a control system containing a charging monitor for providing a state of charging estimation of the battery means. In still a further embodiment the charging monitor comprises a SOC-module containing a virtual model of the battery for providing a parallel calculation of the current flow of the battery.

In a second aspect of the invention the objects are achieved by a method for providing a power compensation of an electric power transmission line, wherein the method comprises, forming an energy storage device of a battery means containing a plurality of series connected battery units having a short circuit failure mode for achieving a voltage in the range of 6 kV and above, providing in a first mode of operation electric energy from the battery units to the transmission line, and receiving during a second mode of operation electric energy from the transmission line to the battery units. In a further embodiment the method comprises that each operation mode comprises an estimation of the state of charge of the battery means.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

According to a further embodiment of the invention an SOC-value is estimated by current value provided from multiple parallel calculations with the help of the virtual battery model. A first value of the voltage over the battery unit is calculated from the measured current. In parallel the voltage is calculated with a plurality of chosen current values, each deviating a small amount from the measured current value. Each such calculated voltage value is compared with the actual measured voltage value. When a close match between the calculated voltage value and the measured voltage value is achieved the input current value for the matching calculation is chosen as the actual current value.

Figure 2:
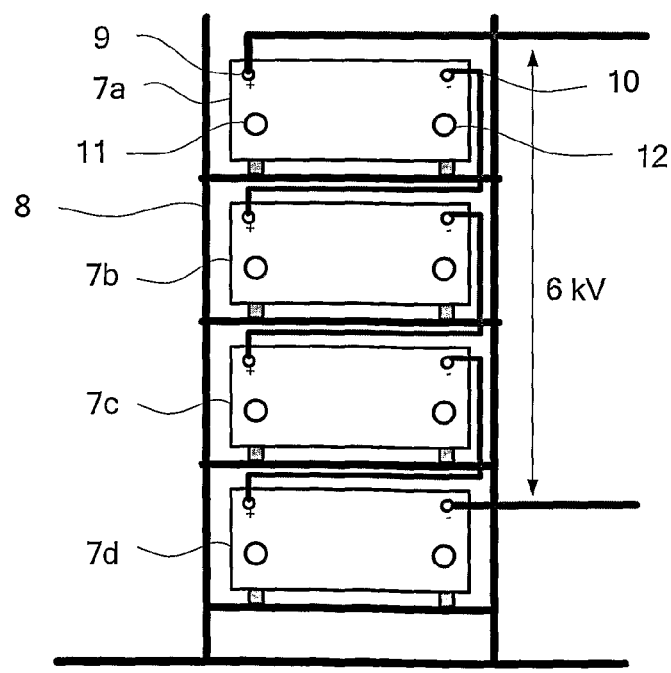
FIG. 2 is a side elevation of an energy storage device comprising a plurality if battery units according to the invention.

The energy storage device comprises a plurality of series connected battery units 7. In the embodiment shown in FIG. 2 four battery units 7a-7d are arranged in a rack 8. Each battery unit has a positive terminal 9 and a negative terminal 10. In the embodiment shown each battery unit has a voltage of 1500 volts thus the energy storage device containing four batteries connected in series has a voltage level of 6 kV. However there may also be many more batteries in series resulting in a much higher voltage level.

The energy storage device comprises high energy, high temperature batteries containing sodium/metal chloride battery cells having an operating temperature in the range of 270-340° C. Each battery unit comprises a heat insulated box containing a plurality of series connected battery cells. In operation such as charging or discharging the batteries produce heat. At the idling mode heat from outside the battery must be provided for keeping the operational temperature conditions. The battery unit therefore contains a local pipe loop having a first opening 11 for receiving a stream of a gaseous medium, and a second opening 12 for exhausting the gaseous medium.

Figure 3:
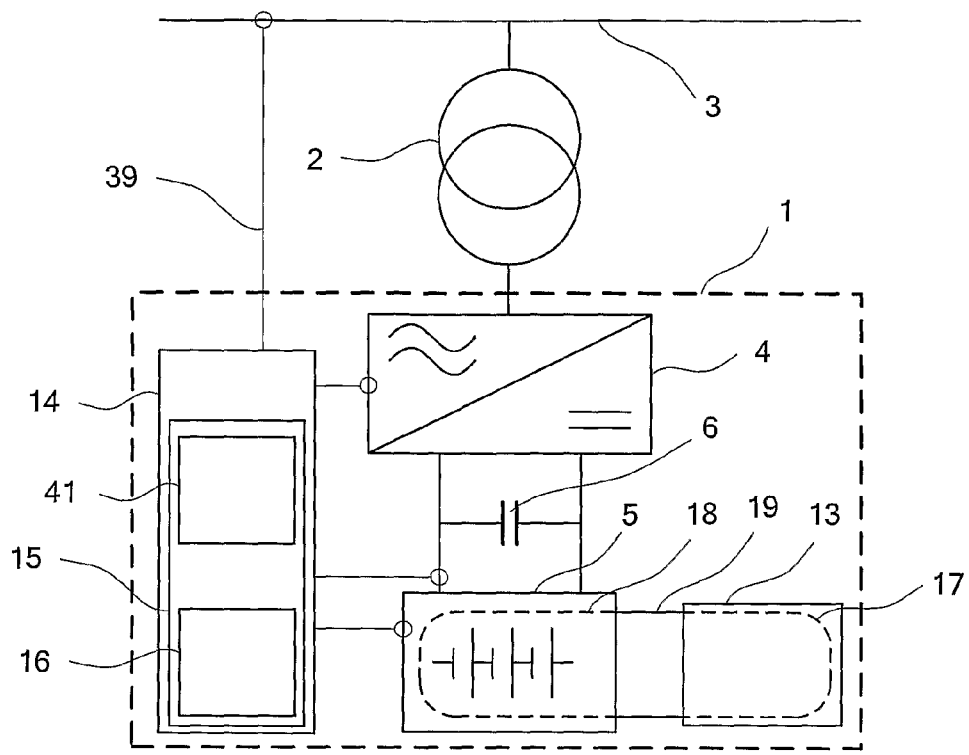
FIG. 3 is a principal layout of a power compensator including a temperature monitor and a charge monitor.

A sodium/metal chloride battery cell comprises an electrolyte contained in a thin barrier of a ceramic material. When the battery is charged or discharged a reaction front is propagating inwardly from the ceramic barrier. Thus both the charging and discharging is propagating in the same direction and starting from the ceramic barrier. Resulting from a plurality of charging and discharging cycles there may be left inside the battery cell a plurality of areas defining power capacity areas and non-power capacity areas.

in further embodiment of the invention is shown in FIG. 3. In this embodiment the power compensator 1 comprises not only a voltage source converter 4 and an energy storage device 5 but also a temperature monitor 13 and a control system 14 containing a plurality of sensor means 39, computer means 41 and a charge monitor 15. The charge monitor comprises a module 16 for estimating the state of charge of the battery. The temperature monitor 13 comprises a pipe network for housing a heat transfer medium. The pipe network comprises a main pipe loop 17, a local loop 18 located in each battery unit and a plurality of connection pipes 19 connecting the main loop with the local loops. The temperature monitor contains at least one heat providing means and a fluid moving unit for circulating the heat transfer medium in the pipe network. Hence by circulating the heat transfer medium through each battery heat is provided to the batteries by convection. In the embodiment shown the heat transfer medium comprises air and the fluid moving unit comprises a fan.

Figure 4:
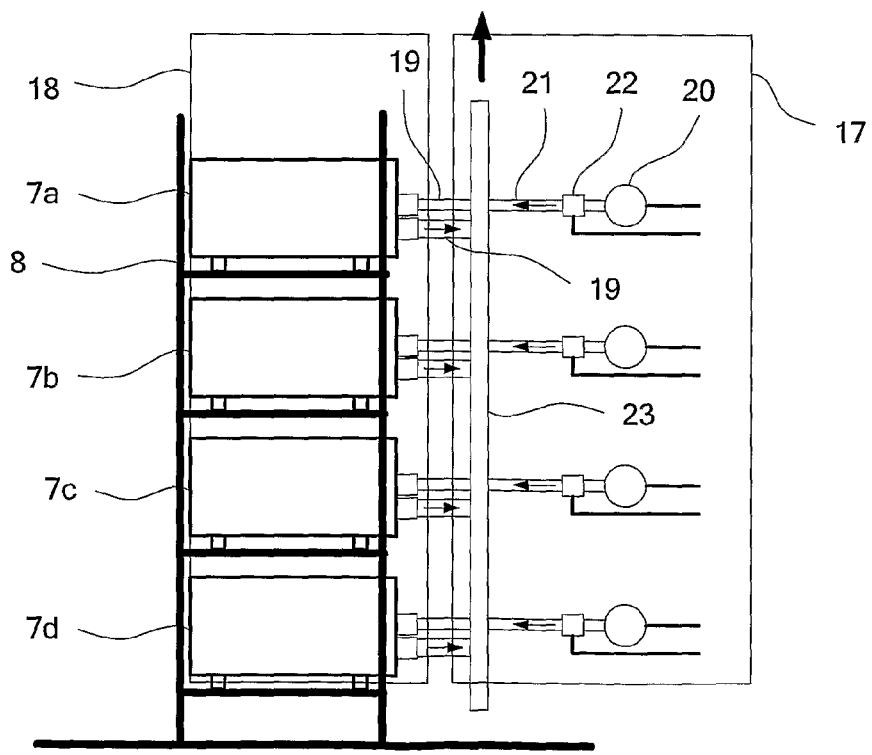
FIG. 4 is side elevation of an energy storage device and a temperature monitor.

In FIG. 4 the temperature monitor 13 is schematically divided into a main pipe loop 17 and a common local pipe loop 18. In this embodiment the local pipe loop exhibits a high voltage potential while the main loop exhibits a ground potential. The connection pipes which connect the main pipe loop and the local pipe loop must not only exhibit an electric insulation but also withstand a fluid medium having a temperature of approximately 300° C. The main loop in this embodiment comprises a separate fan 20 and a pipe part 21 for each battery unit. Each pipe part comprises a heat providing element 22 for heat delivery to the battery unit. The heat delivery unit may comprise a resistive element for connection to a low voltage electric power source.

Figure 5:
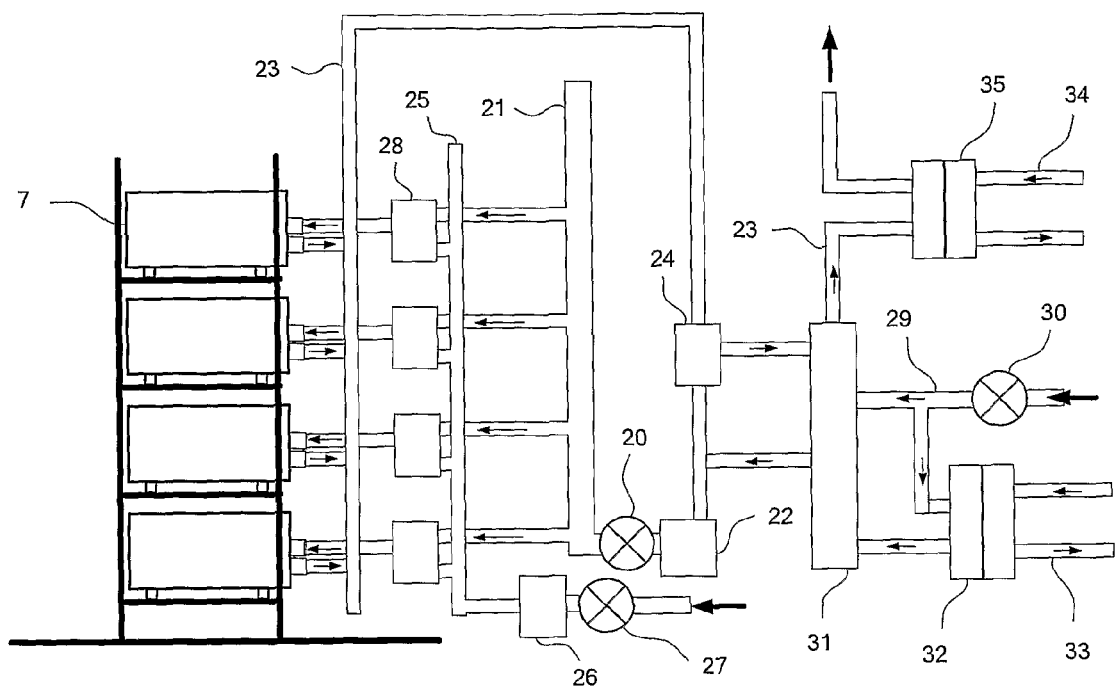
FIG. 5 is a further embodiment of the temperature monitor.

A further development of a temperature monitor is shown in FIG. 5. In this embodiment the main loop of the temperature monitor further comprises a common heating system 23 including a heater 22 and a common fan 20. According to this embodiment there is also provided for cooling of the battery units. Thus there is arranged a cooling loop 25 with a cooler 26 and a common cooling fan 27. The provision of cooling or heating may be chosen by a switching valve 28. Also in the embodiment shown the heating system comprises an extension loo passing through a heat storage device 31. A valve 24 can control exhaust air between the heating system 23 and the heat storage device 31. Further the system comprises a second loop 29 passing through a heat exchanger 32 for heat exchange with a second fluid system 33 which may comprise cooling water from the voltage source converter valves. The heating system also comprises a an extension loop passing through a second heat exchanger 35 for heat exchange with second heating system 34 which may be a heating system for a building.

Figure 1:
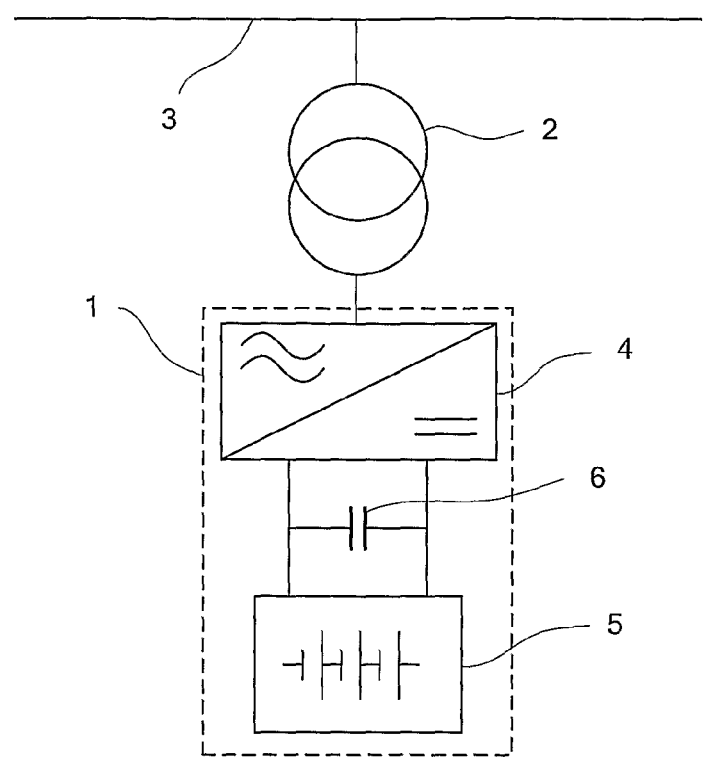
FIG. 1 is a principal circuit of a power compensator according the invention.
Figure 6:
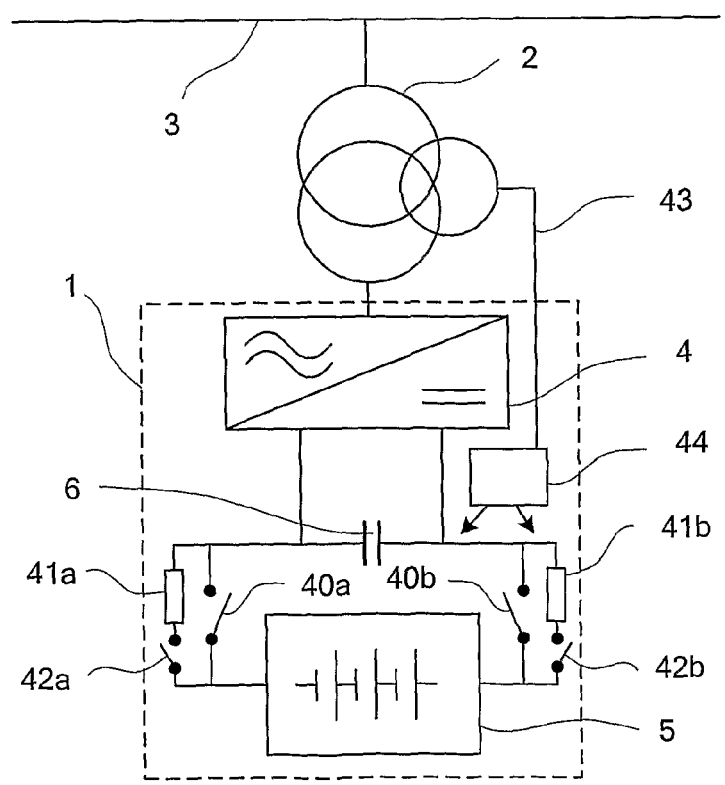
FIG. 6 is a yet further embodiment of the invention for black start capacity.

A principal circuit of a power compensator 1 for black start capability is shown in FIG. 6. Using the same references as in FIG. 1 the power compensator is connected via a transformer 2 to an electric power transmission line. The power compensator comprises a voltage source converter 4, a capacitor means 6 and an energy storage device 5. In the embodiment shown the energy storage supply comprises battery means. The voltage source converter has an ac side connected to the transformer and a dc side connected to the capacitor means and the energy storage device. The power compensator comprises a first and second main switch 40a, 40b for disconnecting the battery means. In parallel with the main switches there are arranges a first and second parallel path containing a resistor means 41a, 41b and a secondary switch 42a, 42b. The power compensator also comprises a control means 44 for controlling the switches. Normally the control means receives auxiliary power from a separate winding 43 of the transformer.

In case of a power outrage of the network the control means also comprises battery means and computer means for control of the switches during a dead network situation.

Although favorable the scope of the invention must not be limited by the embodiments presented but contain also embodiments obvious to a person skilled in the art.

The invention claimed is:

1. A power compensator for an electric power transmission line, comprising:
    a voltage source converter having an ac side connected to the transmission line and a dc side connected to a capacitor; and
    an energy storage device, wherein the power compensator is configured to provide a black start of a dead transmission line, the energy storage device is configured to energize the capacitor and comprises a high voltage battery having a short circuit failure mode, a first main switch and second main switch for disconnecting the battery from the capacitor, and a control unit for operating the first and second switches, and wherein the power compensator is configured to perform said black start by energizing the capacitor from the battery and when the capacitor has been energized, start switching the voltage source converter, resulting in ac power being provided to the transmission line.

2. The power compensator according to claim 1, wherein further comprising:
a first branch comprising a first resistor and a first secondary switch, wherein the first branch is connected in parallel with the first main switch.

3. The power compensator according to claim 2, further comprising:
a second branch comprising a second resistor and a second secondary switch, wherein the second branch is connected in parallel with the second main switch.

4. The power compensator according to claim 1, wherein the energy storage device comprises a high energy, high temperature sodium/metal chloride battery.

5. The power compensator according to claim 1, further comprising:
a temperature monitor for keeping the temperature within a operation range of the battery.

6. The power compensator according to claim 1, further comprising:
a control system comprising a charging monitor for providing a state of charging estimation of the battery.

7. The power compensator according to claim 6, wherein the charging monitor comprises a SOC-module comprising a virtual model of the battery for providing a calculation of the current flow of the battery.

8. A method for providing a black start of a dead network comprising a voltage source converter, a capacitor and an energy storage device, the method comprising:
energizing the capacitor from the energy storage device,
starting switching the voltage source converter, and
controlling a power flow of a power compensator to and from the network in dependence on a balance of power producers and power consumers connected to the network.

9. The method according to claim 8, wherein the energizing comprises forming a current path comprising a resistor in order to decrease a current flow between the capacitor and the energy storage device.

10. A computer program product, comprising:
a non-transitory computer readable medium; and
computer program instructions recorded on the computer readable medium and executable by a processor to carry out a method for providing a black start of a dead network comprising a voltage source converter, a capacitor and an energy storage device, the method comprising energizing the capacitor from the energy storage device, starting switching the voltage source converter, and controlling a power flow of the power compensator to and from the network in dependence on a balance of power producers and power consumers connected to the network.

11. The computer program product according to claim 10, wherein the computer program instructions are provided at least in part over a network.

12. The computer program product according to claim 10, wherein the computer program instructions are provided at least in part over the internet.

* * * * *